United States Patent Office 3,224,301
Patented Dec. 21, 1965

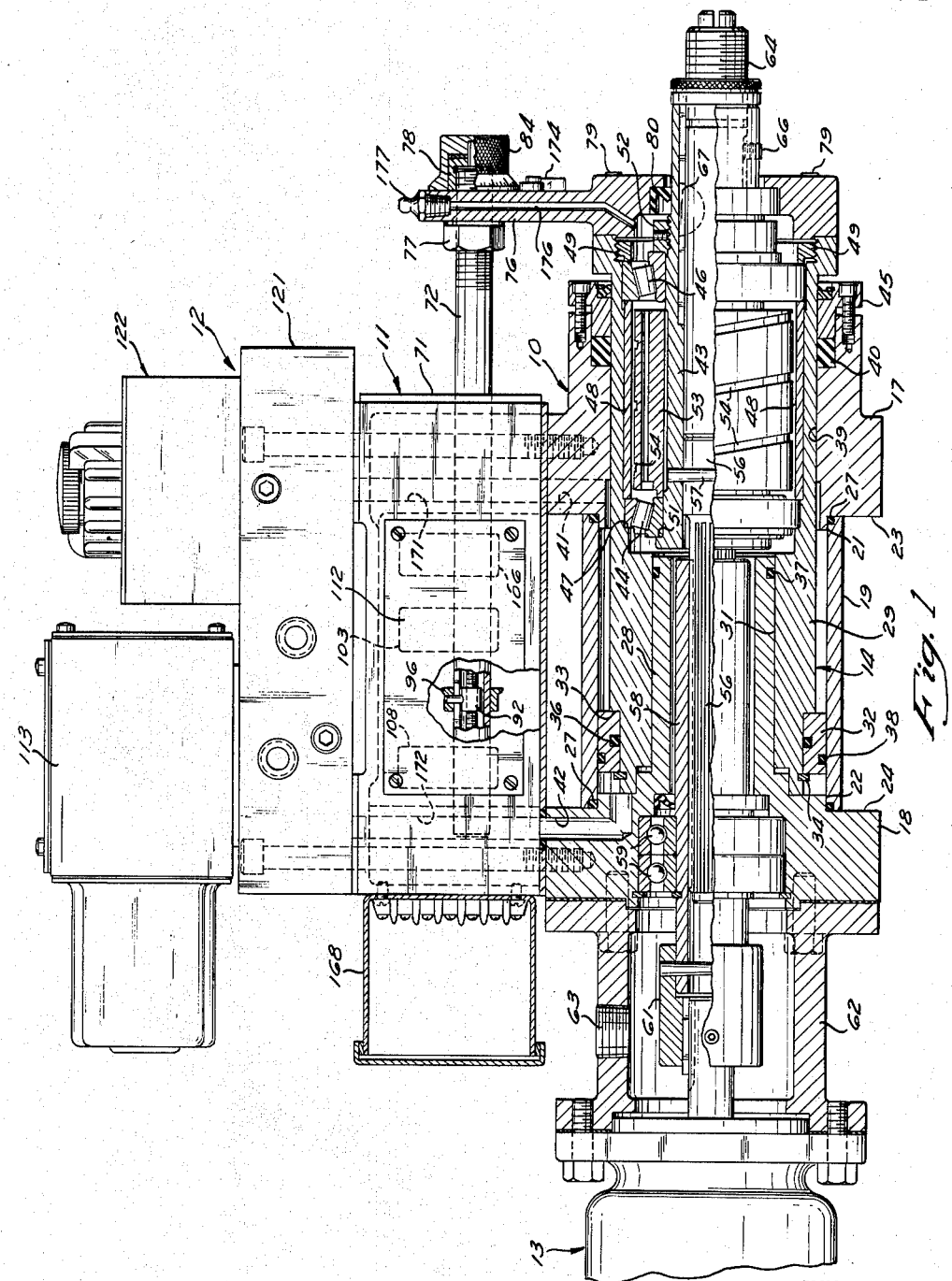

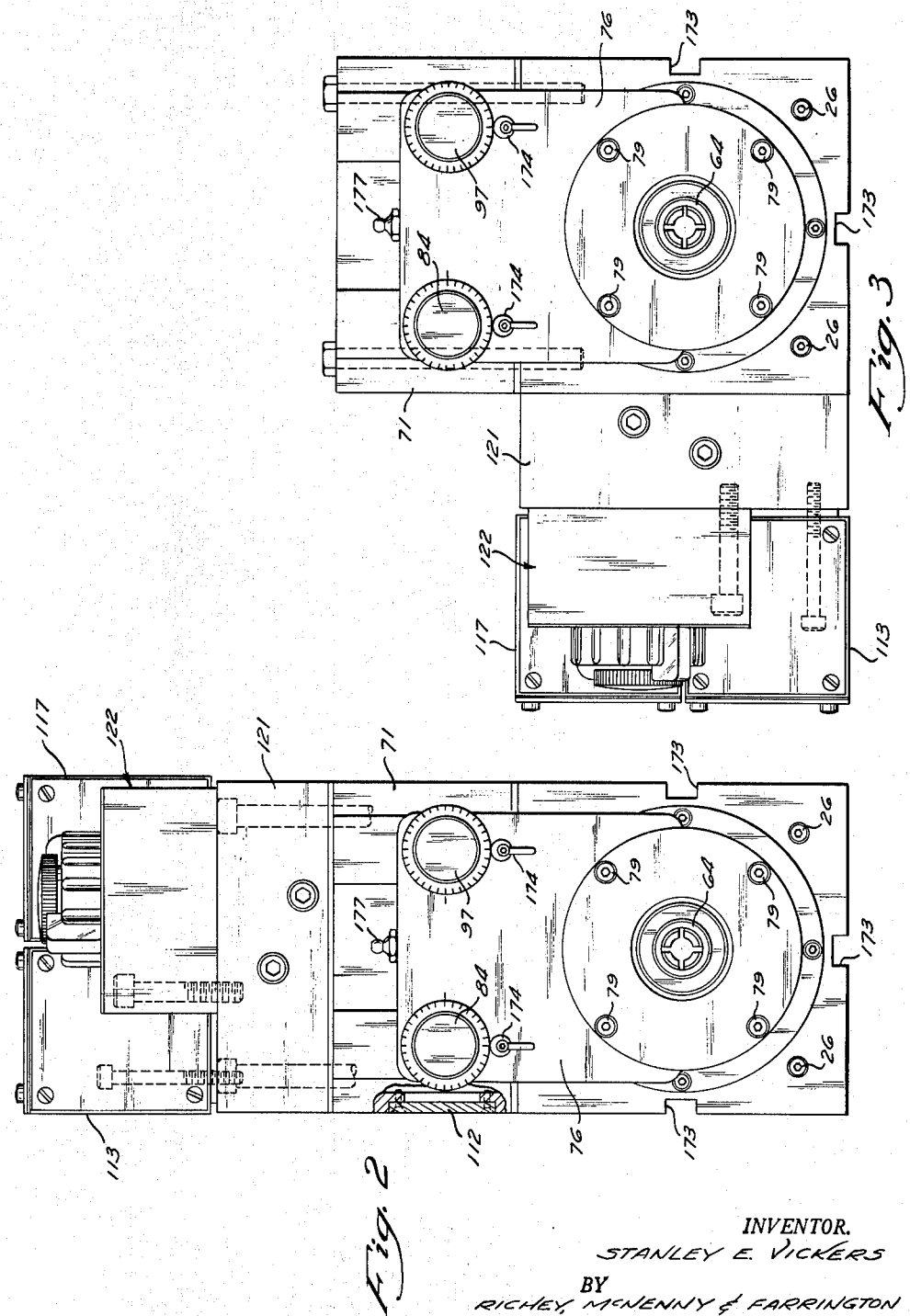

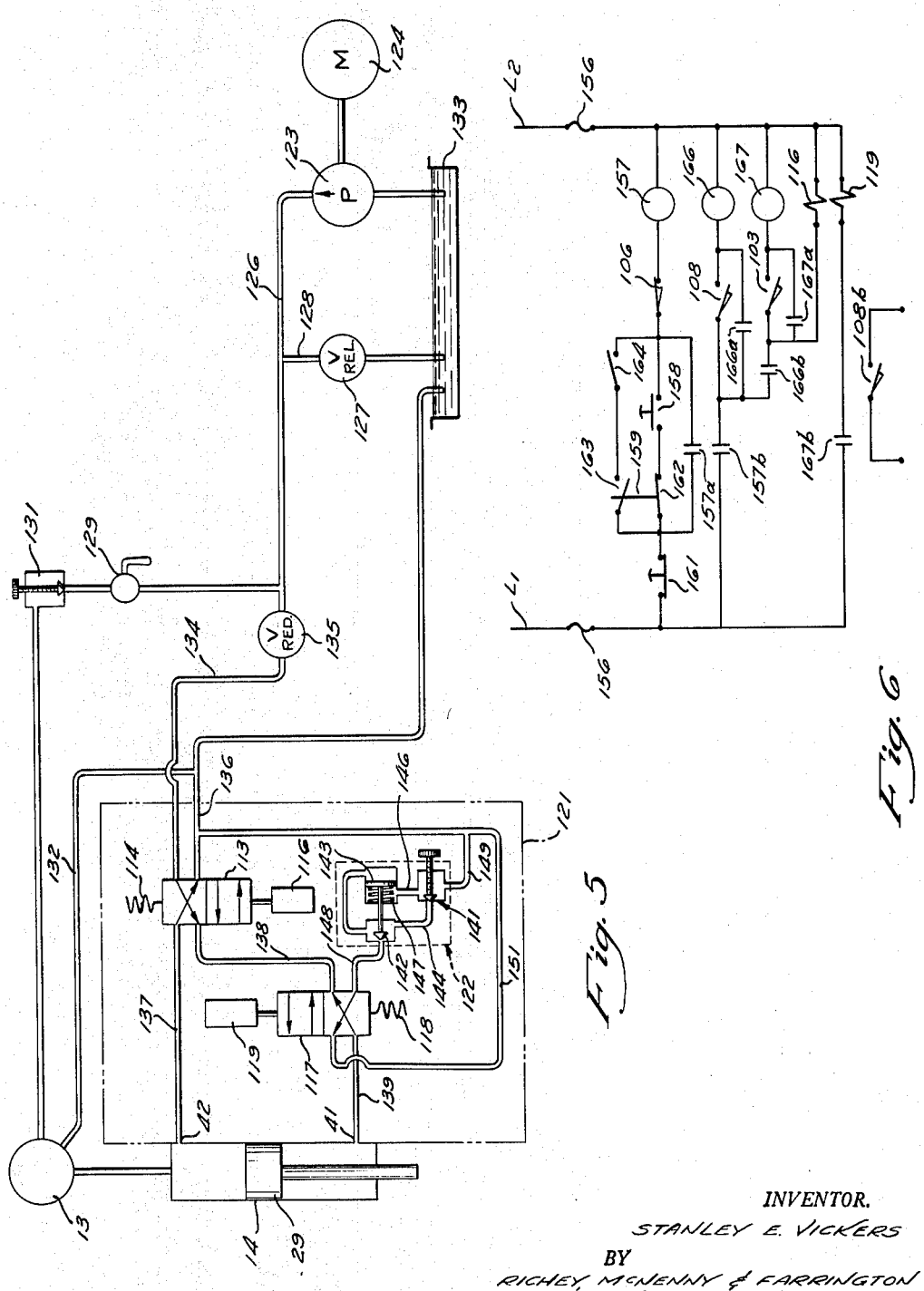

3,224,301
HYDRAULIC DRILL UNIT
Stanley E. Vickers, Columbus, Ohio, assignor, by mesne assignments, to Imperial Manufacturing Company, Middlefield, Ohio, a corporation of Ohio
Filed Mar. 16, 1962, Ser. No. 180,168
10 Claims. (Cl. 77—32.7)

This invention relates generally to power units for cutting tools and more particularly to a novel and improved hydraulically powered automatic drilling and boring unit suitable for precision machining operations in an automated system.

Automatic production equipment is often constructed of a plurality of work units mounted to perform individual machining operations either simultaneously or sequentially on a workpiece which is automatically positioned before the units. In many typical installations workpieces are carried by an indexing table and are presented sequentially to a plurality of machining units each of which performs a necessary machining operation. Such automatic machines are often custom manufactured and represent a considerable capital expenditure. For this reason such specialized machinery is economically prohibited unless a production quantity of the parts manufactured thereby is very high or unless the machine is constructed of individual elements which can be rearranged or readjusted to permit the manufacture of a number of different parts. A unit incorporating this invention is easily and quickly adjustable to change the stroke characteristics. This permits the unit to be used in the manufacture of a variety of parts so that it is economically sound to make the required capital expenditure even when the production rates of any given part is not particularly high.

An automatic drill unit incorporating this invention is also constructed and arranged so that the unit may be assembled in a variety of ways to change the space envelope of the assembled unit. This again increases the utility of the unit since it can be assembled to fit into different machines even when space is a problem.

The stroke feed is arranged so that the length of stroke and rate of feed is accurately controlled. The rate of feed during machinery is maintained constant even when the tool breaks out of the workpiece. Therefore, burrs are eliminated and tool wear is minimized.

It is an important object of this invention to provide a novel and improved hydraulically powered automatic drill unit controlled to provide a constant rate of feed during the machining operation to minimize tool wear and produce uniform surface finishes.

It is another important object of this invention to provide a novel and improved hydraulically powered drill unit wherein the tool feed is uniform throughout the cutting stroke so that burrs are not developed as the tool breaks out of the workpiece.

It is another important object of this invention to provide a novel and improved hydraulically powered drill unit having fast feed and retract operation to minimize the total cycle time of the unit.

It is still another object of this invention to provide a novel and improved drill unit which can be easily and quickly adjusted to change the stroke characteristics and the rate of feed.

It is another important object of this invention to provide a hydraulically powered drill unit incorporating stroke and power controls constructed and arranged to permit their assembly in a variety of positions so that the space envelope of the asesmbled unit can be changed to fit the available space of a variety of installations.

It is still another object of this invention to provide a novel and improved drill unit incorporating stroke and power control means constructed and arranged to minimize external piping.

Other important objects and advantages will appear from the following description and drawings wherein:

FIGURE 1 is a side elevation partially in longitudinal section illustrating the structural details of the drill unit incorporating this invention;

FIGURE 2 is an end view of the assembled drill unit illustrating one mode of assembling of the various components of the complete unit;

FIGURE 3 is a view similar to FIGURE 2 illustrating how the controls may be assembled in a manner to change the space envelope of the assembled unit;

FIGURE 5 is a schematic view of the hydraulic circuit for the control of the unit; and FIGURE 6 is a schematic drawing of the electrical circuit for the control of the unit.

Figure 4:
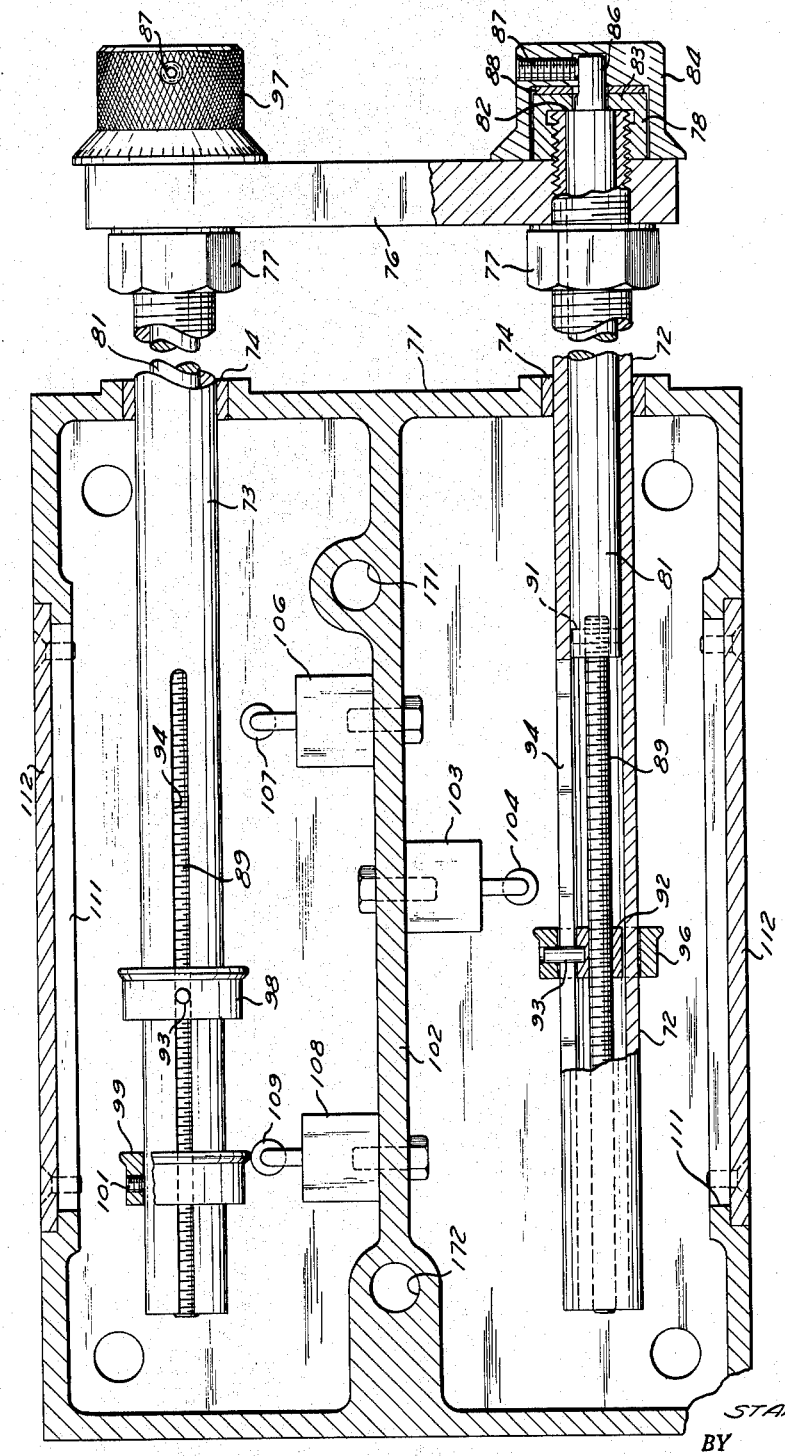
FIGURE 4 is a plan view partially in section illustrating the structure of the stroke adjustment mechanism.

Although the unit incorporating this invention is described and used for normal drilling operations, it should be understood that a variety of cutting tools can be used in conjunction with the unit such as milling cutters, reamers, and other tools which operate while rotating about an axis.

Referring to FIGURE 1, a preferred form of a drill unit incorporating this invention includes three basic assemblies, the power assembly 10, the electrical control assembly 11, and the hydraulic assembly 12. The power assembly 10 includes a reversible hydraulic motor 13 which is used to provide the rotary power and may be of any suitable type such as a vane or gear type motor. The power assembly 10 also includes a piston and cylinder type hydraulic actuator 14 which is operable to fast feed the cutting tool to a position adjacent the workpiece, slow feed the tool at a uniform velocity during the cutting operation and then rapidly retract the tool to the initial retracted position clear of the workpiece.

The electrical control assembly 11 and the hydraulic control assembly 12 cooperate to control the motor 13 and actuator 14 to produce the required cycle of operation. These controls may be arranged for either manual operation or automatic operation. In manual operation it is necessary to manually initiate a cycle of operation. This mode of operation is normally used with manual feeding of the workpieces. Automatic operation is used primarily in conjunction with an assembled machine having automatic workpiece feeding devices such as indexing tables which automatically position a workpiece for the machining operation. When the drill unit is used in conjunction with such an automatic feed system, the cycle of operation is initiated automatically as soon as the workpiece is properly positioned, and the various components are interconnected in such a way as to provide completely automatic cyclic operation of the system.

The base of the power assembly 10 is formed of a forward end bell 17 and a rearward end bell 18 positioned on opposite ends of a cylinder member 19. Each of the end bells 17 and 18 are formed with a cylindrical shoulder 21 and 22 respectively, which fits into opposite ends of the cylinder member 19 and provides radial location therefor. The ends of the cylinder member 19 are clamped against radial walls 23 and 24 by tie rods 26 illustrated in FIGURES 2 and 3. O-ring seals 27 prevent leakage between the cylinder member 19 and the two end bells 17 and 18.

The end bell 18 is formed with an axially extending tubular collar 28 which extends concentrically along and spaced within the cylinder 19. A piston member 29 is formed with an inner bore 31 which engages with a sliding fit the outer surface of the tubular collar 28. A piston head 32 is mounted on the piston 29 against a shoulder 33 by a snap ring 34. An O-ring seal 36 mounted on the piston head 32 prevents leakage between the piston 29 and the piston head 32. A dynamic seal 37 is mounted on the tubular collar 28 adjacent the forward end thereof and engages the bore 31 of the piston 29 providing a fluid seal therewith. A second dynamic seal 38 mounted on the piston head 32 engages the inner wall of the cylinder 19 to provide a fluid seal therebetween.

The forward end of the piston 29 extends through a bore 39 in the forward end bell 17 providing lateral support for the piston. A dynamic seal 40 mounted in the forward end of the end bell 17 by a seal retainer 45 bolted to the end bell 17 provides a fluid seal between the end bell 17 and the outer surface of the piston 29.

When fluid under pressure is applied to the rearward or left end of the piston 29, it reacts upon an effective area equal to the cross-sectional area between the tubular collar 28 and the inner wall of the cylinder wall 19 and produces a force urging the piston 29 to the right. Conversely, when fluid under pressure is introduced to the forward or right side of the piston head 32, it produces a force reaction on an effective area equal to the difference in cross-sectional areas between the bore 39 and the inner wall of the cylinder member 19, urging the piston to the left. The forward end bell 17 is formed with a radial port 41 through which liquid is admitted to, or exhausted from, the right side of the piston head 32 and the rearward end bell 18 is formed with a port 42 through which liquid is admitted to, or exhausted from, the left end of the piston 29.

The piston 29 serves as a carrier for a spindle 43 to produce forward and rearward reciprocation thereof. The spindle 43 is journaled in opposed antifriction bearings 44 and 46 for rotation relative to the piston but is axially fixed relative to the piston so that the axial movement of the piston produces similar axial movement of the spindle. The outer race of the bearing 44 is seated against a shoulder 47 in the piston 29 by a spacer sleeve 48. The opposite ends of the spacer sleeve 48 engages the outer race of the bearing 46 and the entire assembly is locked in position by a lock ring 49 threaded into the outer end of the piston 29. Similarly, the inner race of the bearing 44 is seated against a shoulder 51 by the engagement of the inner race of the bearing 46 with a lock nut 52 threaded onto the spindle 43. The bearings 44 and 46 are opposed thrust bearings positioned so that the bearing 44 resists thrust to the right and the bearing 46 resists thrust to the left. Positioned between the two bearings 44 and 46 is a lubrication ring 53 formed with external spiral grooves 54 which serve to carry lubrication from the zone adjacent to the bearing 46 to the zone adjacent the bearing 44. This is particularly important to lubricate the bearing 44 when the unit is mounted in an inclined or vertical position.

To rotate the spindle 43 a sliding spline drive is provided to connect the spindle to the motor 13. A quill member 56 formed with an external spline is mounted at its forward end in the spindle by a taper pin 57. The rearward end of the quill 56 extends into a tubular member 58 formed with an internal axial spline engaging the external spline of the quill 56. The tubular member 58 is journaled in the rearward end bell 18 by means of antifriction bearings 59 so that it is axially fixed and rotatable relative to the base of the unit. The rearward end of the tubular member 58 is connected to the shaft of the motor 13 by a coupling assembly 61. To mount the motor 13 on the rearward end bell 18, a spacer housing 62 is provided. Access to the coupling 61 is provided by a removable plug 63 mounted in the housing 62. In the operation of the power unit the motor 13 rotates the spindle 43 through the connection of the quill 56 and tubular member 58. This provides a positive mechanical drive even though the spindle 43 is moved axially relative to the housing since the quill will slide in and out of the member 58. When liquid under pressure is admitted to the rearward side of the piston 29 through 42, the piston extends carrying with it, the spindle 43. Conversely, when liquid under pressure is supplied to the right end of the piston head 32 through the port 41. The piston 29 retracts again carrying the spindle 43 to the retracted position. A suitable chuck 64 is mounted in the forward end of the spindle 43 by a set screw 66 and is locked against rotation relative thereto by a key 67.

The electrical control assembly 11 is utilized to sense the position of the piston 29 relative to the housing. Since the spindle 43 is axially fixed relative to the piston 29, this also results in the sensing of the position of the spindle 43 relative to the housing and in turn the position of the cutting tool mounted in the chuck 64. The electrical control assembly 11 functions to operate the solenoid valves of the hydraulic control assembly 12 at predetermined points in the cycle and thereby control the cyclic operation of the unit.

Means are provided for easily and accurately adjusting the electrical control assembly so that the cycle of operation can be modified to meet the requirements of any particular machining operation. The electrical control assembly consists of a control housing 71 bolted to the two end bells 17 and 18. A pair of control rods 72 and 73 extend through bushing 74 in the housing 71 (illustrated in FIGURE 4) and are supported at their forward end on a control arm 76. Each of the control rods 72 and 73 is provided with a lock nut 77 engaging the rearward side of the control arm 76 and a lock nut 78 engaging the forward side of the control arm so that the outer end of each control rod is firmly anchored. Referring to FIGURE 1, the control arm 76 is bolted to the forward end of the piston 29 by symmetrically located bolts 79 and is provided with a wiper ring 80 engaging the outer surface of the spindle 43 to prevent entry of dirt, chips and the like.

Referring again to FIGURE 4, the structure of the control rods 72 and 73 and their associated cam adjustment mechanism is identical so only the control rod 72 and its associated elements will be discussed in detail with the understanding that the discussion applies equally to the control rod 73. The control rod 72 is tubular to receive a control shaft 81 extending inwardly from the outer end of the control rod. The control shaft is provided with a shoulder 82 engaging an inwardly extending flange 83 on the lock nut 78. A control knob 84 extends over a reduced diameter shank 86 formed on the control shaft 81 and a set screw 87 threaded into the control knob 84 locks against a flat formed on the shank 86. A thrust bearing 88 is positioned between the end of the lock nut 78 and the control knob 84. With this structure, the control shaft 81 is axially fixed relative to the control rod 72 but is rotatable relative thereto by means of the control knob 84. Threaded into the rearward end of the control shaft 81 is a cam adjusting screw 89 which is locked in position by a cross pin 91. A cam nut 92 is threaded onto the cam screw 89 and is provided with a pin 93 extending radially through an axial slot 94 formed in the control rod 72. The pin 93 prevents rotation of the cam nut 92 so rotation of the screw 89 by means of the control knob 84 produces axial movement of the cam nut 92. A ring type cam 96 fits over the control rod 72 with a sliding fit and is provided with a radial bore to receive the pin 93. Thus the position of the cam 96 on the rod 72 is determined by the pin 93 and in turn the cam nut 92. When it is desired to adjust the cam axially along the control rod 72, it is merely necessary to rotate the control knob 84 thereby rotating the screw 89 and producing axial movement of the nut 92. Once the cam is moved to the adjusted position, it is retained in such position by locking the knob 84 against rotation.

A control knob 97 on the control rod 73 is used to control the position of the cam 98 associated therewith.

A second cam 99 is mounted on the control rod 73 by a set screw 101. This cam determines the rearward extreme or retracted position of the piston which normally remains the same regardless of the cycle of operation so this cam 99 is not adjusted by the control knob 97 but rather is mounted in a fixed position at the time of the assembly of the unit.

The control housing 71 is provided with a central web 102 on which the limit switches are mounted. A limit switch 103 is mounted on the web 102 with its operator 104 positioned for engagement by the cam 96. A similar limit switch 106 is mounted on the web 102 with its operator 107 positioned for engagement by the cam 98. A third limit switch 108 is limited on the web 102 with its operator 109 positioned for engagement by the cam 99. The control housing 71 is formed with side openings 111 to provide access to the interior of the housing. These openings are closed during normal operation by removable covers 112.

Referring to FIGURE 5, two solenoid operated four-way valves are used to control the flow to the actuator 14. The first solenoid valve 113 is a two position four-way valve normally maintained by a spring 114 in the position illustrated in FIGURE 5. A solenoid 116 is connected to the valve 113 and operates when energized to shift the valve to the other position. A second similar solenoid valve 117 of the two position four-way type is normally maintained by a spring 118 in the position illustrated and is operated by a solenoid 119 when the valve is shifted. In the preferred form of this invention, two solenoid valves 113 and 117 are mounted on a manifold plate 121 illustrated in FIGURES 1 to 3 and schematically represented by a dotted line in FIGURE 5. Also, mounted on the manifold 121 is an adjustable constant flow valve 122.

A pump 123 normally powered by an electric motor 124 supplies liquid under pressure to an output line 126. A pressure relief valve 127 is connected to the line 126 by a line 128 and operates to prevent over-pressurizing of the system. The pressure line 126 is connected to the motor 13 through a shut off valve 129 and an adjustable flow valve 131 to control the speed of the motor 13. The exhaust from the motor 13 is connected through an exhaust line 132 to a reservoir 133 which supplies the pump 123.

The motor 13 is preferably operated at the pressures in the order of 2,000 pounds per square inch. However, the actuator 14 is preferably operated at a substantially lower pressure in the order of 300 pounds per square inch. In the illustrated system this lower pressure is obtained by using a pressure reducing valve 135 connected at its inlet to the pressure line 126 and at its output to a pressure line 134. The pressure line 134 in turn connects to the inlet port of the valve 113.

In some installations particularly where there are a number of drill units and therefore, a relatively high flow requirement from the pump, it is desirable to use one pump to supply the high pressure fluid and a second separate pump to supply the low pressure fluid. This eliminates the requirement of a pressure reducing valve and results in power savings since the power loss of pressure reduction in the pressure reducing valve is eliminated. The exhaust port of the valve 113 is connected to an exhaust line 136 which in turn connects to the exhaust line 132.

One of the control ports of the valve 113 is connected by a fluid conduit 137 formed in the manifold plate 121 to the port 42 of the actuator 14. The other control port of the valve 113 is connected to the valve 117 by a fluid conduit 138 formed in the manifold plate. The port 41 on the actuator 14 is connected to the valve 117 through the passageway 139 in the manifold plate 121. The constant volume valve 122 is arranged to adjustably provide a constant volume flow therethrough regardless of the pressure of the liquid flowing to the valve. To provide this operation, the valve 122 includes an adjustable orifice 141 in series with a pressure regulating valve 142. The pressure regulating valve 142 is operated by a diaphragm or piston operator 143 referenced on its rearward side to the pressure downstream from the regulator valve 142. This pressure is equal to the pressure leading to the orifice 141 since a pressure line 144 is connected therebetween. The other side of the piston 142 is connected to the downstream side of the orifice 141 by a line 146. A spring 147 biases the piston 143 in a direction which tends to open the regulating valve 142. Therefore, the regulating valve 142 in combination with the piston 143 and spring 147 operates to maintain a constant pressure differential across the orifice 141 regardless of the pressure flowing into the flow control valve assembly 122 through the inlet line 148. Since the pressure drop across the orifice 141 is constant and the pressure of the liquid is maintained at substantially reservoir pressure, the flow through the valve 122 is constant for any given setting of the valve. The line 148 is connected to one of the control ports of the valve 117 and the exhaust is connected through a line or conduit 149 to the line 136 and therethrough to the reservoir. A conduit 151 also connects one of the ports of the valve 117 to the exhaust line 136. It should be understood that to minimize external piping all of the conduits or pressure lines illustrated within the dotted block at 121 in FIGURE 5 are formed in the manifold plate 121 which is directly mounted on the unit. This plate with all its passages is formed so it is merely necessary to bolt the valves 113, 117 and 122 to the upper surface of the plate with appropriate seals to provide all of the connections between these valves.

During the fast forward feed portion of the cycle when the actuator 14 moves the piston 29 from its rearward extreme or retracted position, the valve 113 is shifted so that the line 134 is connected through the conduit 137 to the port 42. The valve of course is shifted by energizing the solenoid 116. During the fast feed portion of the stroke, the valve 117 remains in the position illustrated so the exhaust port 41 is connected through the line 139, the valve 117, the line 138, and the valve 113 to the exhaust 136. During this phase of the operation, the exhaust is not throttled and the piston 29 moves rapidly.

Immediately before the cutting tool enters the workpiece the solenoid 119 is energized to shift the valve 117. When this occurs, the exhaust from the actuator 14 through the port 41 and line 139 flows into the control valve 122 through the line 148. The exhaust of the actuator 14 is, therefore, controlled by the orifice 141 and the rate of forward movement of the piston 29 is maintained constant. During the cutting operation, the tool resists forward movement of the piston 29. This operates to reduce the pressure in the exhaust port 41, so that a relatively low pressure drop occurs at the regulating valve 142.

If the drilling or cutting operation is such that the tool breaks out after completing the machine operation, there would be a tendency for the piston to move at a higher rate if it were not for the constant flow control of the exhaust from the actuator 14. When the tool load drops, the valve 122 still maintains a constant flow so the pressure builds up in the exhaust port 41 to assure that the piston will continue to move with a constant velocity. This eliminates the burrs so often occurring when a drill or similar tool breaks out of the workpiece at the completion of the cutting operation. By utilizing liquid to power the feed, it is possible to accurately control the velocity feed regardless of the load on the tool since liquid at the pressures occurring in the feed system is for all practical purposes incompressible. The pressures of the liquid in the feed circuit are also chosen to be relatively low, to eliminate any resiliency or springing effect in the lines or the like.

After the completion of the machine operation, both of the solenoids 116 and 119 are de-energized and the springs 114 and 118 return their associated valves to the positions of FIGURE 5. When this occurs, pressurized liquid is supplied to the port 41 and the port 42 is connected to exhaust. This produces rapid retraction of actuator 14 so that the complete cycle time of each operation is minimized.

Reference should now be made to FIGURE 6 which is a line to line electrical schematic of the electrical control circuit for the unit. Power is supplied to the system through the power lines $L_1$ and $L_2$ each of which is provided with a fuse 156. A first control relay 157 is connected across the line in series with a normally closed contact of the limit switch 106, a normally open start switch 158, a selector switch 159 and a normally closed stop switch 161. The selector switch is provided with two contacts 162 and 163 which are connected together so that only one is closed at any time. When the contact 162 is closed, the start switch 158 is in the circuit and it is necessary to manually close the start switch each time the unit is to be cycled. The contact 163 on the selector switch 159 is connected in series with a normally open switch 164 mounted on the feeding system and arranged to provide a momentary contact when a workpiece is properly positioned for the machining operation. The two contacts 163 and 164 are connected in parallel with the contacts 162 and the start switch 158.

When automatic operation is required, the selector switch 159 is moved to close the contact 163 so that the unit will be re-cycled each time the contact or switch 164 is closed by the feeding mechanism for the workpieces.

A normally open interlock 157a is closed when the first relay 157 is energized to provide a holding circuit around the selector switch and the starting switches 158 and 164. A second normally open interlock 157b on the first control relay 157 is connected in series with a second control relay 166 and the normally open contact of the limit switch 108. A holding circuit for the second control relay 166 is provided by a normally open interlock 166a connected in parallel with the limit switch 108. A second normally open interlock 166b on the relay 166 is connected between the interlock 157b and the limit switch 108, and is in series with the normally open limit switch 103 and a third control relay 167. A holding circuit is provided for the third control relay 167 by a normally open interlock 167a on the relay 167.

The solenoid 116 is connected on one side to the supply $L_2$ and on the other side to the line connecting the normally open interlock 166b and the limit switch 103. The solenoid 119 is connected across the line in series with a normally open interlock 167b on the relay 167. When the drill unit is in its retracted position, which is the position at the start of each cycle, the limit switch 108 is closed by the cam 99 as illustrated in FIGURE 4.

If manual operation is required, the selector switch 159 is moved to the position illustrated in FIGURE 6 and the start switch 158 is momentarily closed. This energizes the relay 157 closing the interlocks 157a and 157b. The interlock 157a provides a holding circuit for the first relay 157 which maintains the energization of the relay after the switch 158 is released. Since the limit switch 108 is closed at this time, the interlock 157b through the limit switch 158 causes the second control relay 166 to pick up closing the interlocks 166a and 166b. Here again, the interlock 166a provides the holding circuit and interlock 166b energizes the solenoid 116 which shifts the valve 113 to initiate fast forward feeding of the actuator 14. This continues until the limit switch 103 is closed by its associated cam 96 which causes the third control relay 167 to pick up. This results in closing of the interlock 167a to provide a holding circuit and the interlock 167b which energizes the solenoid 119. When this occurs, the valve 117 is shifted to place the flow control valve 122 in the exhaust circuit of the actuator 14. Therefore, the actuator 14 continues to extend but at a controlled speed determined by the exhaust flow allowed through the valve 122.

When the limit switch 106 is engaged by its associated cam 98, it is opened causing the first control relay 157 to drop out. This opens the interlock 157b and causes the other two relays 166 and 167 to drop out allowing both of the valves 113 and 117 to shift to their normal position illustrated in FIGURE 5. When this occurs, pressure is applied to the forward end of the actuator 14 and it is caused to rapidly retract to its initial position.

In some installations it is desirable to provide an interlock which senses the fact that the unit has returned to its retracted position. As an example, such a switch can be used to initiate the indexing operation of the indexing table so that a new workpiece will automatically be moved for a subsequent operation as soon as the machining unit completes its operation. For this purpose the limit switch 108 is provided with a normally open switch 108b which is closed as soon as the unit returns to its retracted position. This switch 108b can be connected to the control circuit to the feed device such as an indexing table to initiate an indexing operation. A terminal box 168 (illustrated in FIGURE 1) is mounted on the rearward end of the control housing 71 to make the required electrical connections for the system.

In order to permit the assembly of the unit in a variety of ways so that the space envelope occupied by the assembled unit can be changed to fit in the space available in a variety of installations, the two end bells 17 and 18 are provided with a square section. The unit may be assembled as illustrated in FIGURES 1 and 2 with the electrical control housing 71 mounted on the surface of the end bells containing the ports 41 and 42 and the manifold plate 121 mounted above the electrical control housing 71. The electrical control housing 71 is, therefore, provided with ports 171 and 172 extending through the web 102 as illustrated in FIGURE 4. These ports 171 and 172 are automatically positioned in alignment with the ports 41 and 42 in the end bells 17 and 18 respectively, when the unit is assembled as illustrated in FIGURES 1 and 2. Suitable seals are provided on either side of the control assembly 71. Thus the hydraulic connections of the actuator 14 are internal and external piping is only required for the motor 13.

In FIGURE 3 another manner of assembly is illustrated. In this case the end bells 17 and 18 are rotated counterclockwise 90° and the manifold plate 121 is bolted directly to the face of the end bells containing the ports 41 and 42. The electrical control housing 71 is bolted to one of the other faces of the end bells. The end bells are preferably formed with tapped bolt holes on each side face suitably located so that the electrical control housing 71 can be mounted on any of the faces. An axially extending keyway 173 is formed in each of the side faces of the end bells 17 and 18 to cooperate with a complementary key on a machine frame on which the unit is to be mounted. Again the tapped holes in the end bells cooperate with the keyways 173 for mounting of the assembled unit on the associated machine.

By utilizing relatively low pressure liquid to power the actuator 14 extremely accurate feed control is achieved. The liquid at such pressure is substantially incompressible and any spring effect produced by expansion of the hydraulic conduits in the exhaust circuit is eliminated. Therefore, a uniform rate of feed is achieved even when the load on the cutting tool varies through a substantial range. It is, therefore, possible to drill with a unit incorporating this invention without producing burrs or the like as the tool breaks out of the workpiece. In addition accurate feed control improves the tool life by preventing excessive loads from occurring.

Since the cams 96 and 98 used to operate the limit switches 103 and 106, respectively, are easily adjusted by external control knobs 84 and 97, respectively, the fast feed portion of the stroke and the terminal extended position can be easily and accurately adjusted. Locking dogs 174 having concentric locking surfaces engageable with the edges of the control knobs 84 and 97 are mounted on the arm 76 to lock the respective control knobs in their adjusted positions. To provide lubrication to the bearings, the control arm 76 is formed with a lubrication passage 176 connecting the zone adjacent to the bearing 46 to a lubricating fitting 177.

Although a preferred embodiment of this invention is illustrated, it is to be understood that various modifications and rearrangements of parts may be resorted to without departing from the scope of the invention as defined in the following claims.

What is claimed is:

1. A drive unit for cutting tools comprising a rotatable spindle, a hydraulic motor rotating said spindle, a hydraulic actuator powered by liquid under pressure, positive drive means connecting said actuator and spindle, pressure means connected to said motor supplying liquid to said motor at a first pressure, a pressure reducing valve connected to said pressure means supplying liquid to said actuator at a substantially constant second pressure substantially lower than said first pressure, said liquid at said second pressure being substantially incompressible, an exhaust control through which said liquid is exhausted from said actuator, said exhaust control limiting flow therethrough to a constant rate over substantial ranges of up to said second pressure thereby maintaining a constant velocity of movement of said actuator and spindle.

2. A drive assembly for cutting tools comprising a fluid pressure operated power unit having a frame and an output element, a stroke control connected to said output element operable to produce control signals in response to movement of said output element to predetermined positions, and a fluid control connected to said power unit and stroke control automatically operating said power unit through a predetermined cycle in response to signals from said stroke control, first means for selectively mounting said stroke control on said frame in a plurality of locations each of which is equally spaced from said output element, second means for selectively mounting said fluid control on said stroke control and directly on said frame, said stroke control including flow passages connecting said power unit and fluid control when the fluid control is mounted on said stroke control.

3. A drive assembly for cutting tools comprising a fluid pressure operated power unit having a frame and an output element, an electrical control connected to said output element operable to produce electric control signals in response to movement of said output element to predetermined positions, and a fluid control connected to said power unit and electrical control automatically operating said power unit through a predetermined cycle in response to signals for said electrical control, first means for selectively mounting said electrical control on said frame in a plurality of locations each of which is equally spaced from said output element, second means for selectively mounting said fluid control on said electrical control and directly on said frame, said electrical control including flow passages connecting said power unit and fluid control when the fluid control is mounted on said electrical control.

4. A drive assembly for cutting tools comprising a fluid pressure operated power unit having a frame and an output element, said frame having a plurality of similar mounting faces similarly arranged with respect to said output element, ports in one of said faces through which fluid flows to operate said power unit, a stroke control connected to said output element operable to produce control signals in response to movement of said output element to predetermined positions, and a fluid control connected to said power unit and stroke control automatically operating said power unit through a predetermined cycle in response to signals from said stroke control, said stroke control being mountable on any of said faces, said fluid control being selectively mountable on said one face and on said stroke control when said stroke control is mounted on said one face, said stroke control including flow passages connecting said power unit and fluid control when said fluid control is mounted on said stroke control.

5. A drive unit for cutting tools comprising a power assembly having a base and a power driven tool holder rotatable about an axis, said base being formed with a plurality of similar mounting faces symmetrically arranged around said axis, a stroke control assembly including a housing selectively mountable on any of said faces, means on said stroke control operatively connected to said tool holder in all mounting positions of said stroke control, said base being formed with a pair of fluid ports in one of said faces through which fluid is admitted and exhausted to operate said tool holder, said housing being formed with a mounting surface on the side thereof opposite said power assembly similar to said one face, fluid passages through said housing open to said ports when said stroke control is mounted on said one face, and a fluid control assembly mountable of said one face in communication with said ports when said housing is mounted on a face other than said one face and mountable on said surface of said housing in communication with said passages when said housing is mounted on said one face.

6. A power unit for rotary cutting tools comprising a power assembly having a base assembly and a rotary tool holder reciprocable relative to said base, switch means mounted on said base assembly operable to control the reciprocation of said tool holder, a hollow control rod connected to reciprocate with said tool holder and fixed against rotation, a screw in said control rod axially fixed and rotatable relative thereto, a cam on said rod fixed against rotation relative thereto and adjustably positioned relative to said rod by rotation of said screw, said cam engaging and operating said switch means when said tool holder reach predetermined positions determined by the setting of said screw.

7. A power unit for rotary cutting tools comprising a power assembly having a base, a piston reciprocable relative to said base, a spindle journaled on said piston for rotation relative thereto and fixed against axial movement relative thereto, a plurality of switch means supported by said base, hollow control rods connected for reciprocation with said piston and fixed against rotation relative to said base, and a plurality of switch operators carried by said control rods operating said switches, screw means extending through at least one of said rods threaded to the associated switch operator operable to axially adjust at least one of said switch operators relative to said rods, and a fluid control means connected to supply fluid under pressure to said piston in a manner controlled by said switch means.

8. A drive unit for forming tools comprising a rotatable tool supporting spindle, a hydraulic motor connected to rotate said spindle, a hydraulic actuator connected to reciprocate said spindle between a retracted and an extended position, an exhaust for said actuator, a pump operable to pressurize liquid to a first pressure substantially higher than three-hundred pounds per square inch, a constant flow control including a differential pressure regulator and an adjustable restrictive flow orifice, a pressure reducing valve connected to said pump operable to reduce the pressure of at least a portion of the liquid pressurized by said pump to a substantially constant pressure of about three-hundred pounds per square inch, and valved means operable to connect said pump to said motor and the low pressure side of said pressure reducing valve to said actuator while connecting the exhaust of said actuator to said control means, said liquid being substantially incompressible at all pressures below about three-hundred pounds per square inch whereby said control means maintains a constant rate of flow from the exhaust of said actuator causing said actuator to move said spindle at a substantially constant rate.

9. A drive unit for forming tools comprising a rotatable tool support spindle, a hydraulic actuator connected to reciprocate said spindle between a retracted and an extended position, an exhaust for said actuator, a source of hydraulic fluid under a substantially constant predetermined pressure, constant flow control means operable to regulate flow therethrough to a constant rate over a substantial range of pressures up to said predetermined pressure, said constant flow control means including a flow control orifice and a pressure regulator operable to maintain a substantially constant pressure drop across said orifice, and valve means operable to connect said source to said actuator and said exhaust to said control means, said hydraulic fluid being substantially incompressible at said predetermined pressure whereby the rate of movement of said actuator and spindle is maintained substantially constant.

10. A drive unit for forming tools as set forth in claim 9 wherein said predetermined pressure is no greater than about 300 pounds per square inch.

References Cited by the Examiner
UNITED STATES PATENTS

| | | | |
|---|---|---|---|
| 1,905,132 | 4/1933 | Bishop et al. | 77—32.7 |
| 1,911,138 | 5/1933 | Clute et al. | 77—33.5 |
| 2,925,002 | 2/1960 | Finley et al. | 77—33.5 |
| 2,953,122 | 9/1960 | Zagar | 121—45 |

WILLIAM W. DYER, JR., *Primary Examiner.*

FRANK A. BRONAUGH, *Examiner.*